United States Patent [19]

Zimmermann et al.

[11] Patent Number: 4,590,902
[45] Date of Patent: May 27, 1986

[54] INTERNAL COMBUSTION ENGINE

[75] Inventors: Klaus-Dieter Zimmermann, Vaihingen; Peter Hofbauer, Wolfsburg, both of Fed. Rep. of Germany

[73] Assignee: Robert Bosch GmbH, Stuttgart, Fed. Rep. of Germany

[21] Appl. No.: 698,625

[22] Filed: Feb. 6, 1985

[30] Foreign Application Priority Data

Feb. 29, 1984 [DE] Fed. Rep. of Germany ....... 3407349

[51] Int. Cl.[4] .............................................. F02B 9/08
[52] U.S. Cl. ................................. 123/260; 123/145 A
[58] Field of Search ................... 123/310, 145 A, 260, 123/298, 261

[56] References Cited

U.S. PATENT DOCUMENTS 2,120,768  6/1938  Ricardo ................................ 123/260
2,640,422  6/1953  Malin ................................... 123/310
3,373,724  3/1968  Papst ................................ 123/145 A
4,224,902  9/1980  Binder ................................. 123/260
4,270,499  6/1981  Freland ............................... 123/260
4,340,019  7/1982  Barnert ............................... 123/260

Primary Examiner—Ronald B. Cox
Attorney, Agent, or Firm—Michael J. Striker

[57] ABSTRACT

An internal combustion engine has a plurality of cylinders, a main combustion chamber and a pre-combustion chamber for each cylinder, and overflow passage which opens into the pre-combustion chamber, a fuel injection device and an incandescent ignition arrangement including one or two bar-shaped parts extending into the pre-combustion chamber and arranged so that they are located outside of the projection of the inlet opening of the overflow passage in the pre-combustion chamber and extend with their tips in the edge region of the fuel stream provided by the fuel injection device.

7 Claims, 5 Drawing Figures

INTERNAL COMBUSTION ENGINE

BACKGROUND OF THE INVENTION

The present invention relates to an internal comsution engine.

Internal combustion engines are known which make use of incandescent ignition device with a bar-like spark plug which is arranged at an angle to fuel stream in an approximately spherical whirling chamber. The fuel stream is directed in rotary direction of the air which flows over the overflow passage and substantially tangentially to a central layer of the rotating air whirle inside the whirling chamber. In the known internal combustion engine is proposed by changing the insertion depth to bring the tip of the spark plug to an optimal point relative to the fuel stream which forms a bundle in the course of the insertion path. The axis of the spark plug lies parallel to the plane of symmetry of the whirling chamber, extends through the fuel stream, and the tip of the spark plug ends in a point, which is considered to be optimal, in a central plane of the stream normal to the above-mentioned plane. The known arrangements start from the assumption that with a small approximation of the tip to the stream the time for inflammation of the injected fuel during cold start is increased in undesirable manner, and, on the other hand, with excessive overlapping of the spark plug over the abovementioned point outwardly the thermal and vibrational loading limit of the spark plug is exceeded.

This arrangement has an object of achieving that the directed stream inside the whirling chamber especially with high number of revolutions must be distorted by the spark plug as little as possible. However, it has the disadvantage that with the position change of the injection stream during the operation, for example by carbonization, very fast and increased distance of the stream to the spark plug can take place, so that depending upon the operational conditions of the internal combustion engine and maintenance and function conditions of the fuel injection nozzle, excessively changeable inflammation conditions can take place. For the stream deviation from the predetermined position, heavy flow processes are very influential so that the proposed construction has no advantages in the sense of the constant inflammation conditions as compared with the conventional construction with the spark plug inside the central plane in which the fuel stream is arranged.

In general, in the known whirling chamber arrangement the position of the overflow passage is such that its axis and the axis of the fuel stream lie in one plane. When in addition the axis of the spark plug is arranged in the same plane, the shaft of the spark plug is strongly blown and cooled by the introduced air, so that the desired end temperature of the spark plug is lowered and the inflammation conditions are worsened. Also, with such central position it is necessary to avoid introduction of the tip of the spark plug into the fuel stream, since in this case the thermal loading and the mechanical loading of the spark plug is considerably increased. Therefore, with the known solutions no optimal conditions can be maintained.

SUMMARY OF THE INVENTION

Accordingly, it is an object of the present invention to provide an internal combustion engine which avoids the disadvantages of the prior art.

More particularly, it is an object of the present invention to provide an internal combustion engine with incandescent ignition device with a spark plug having a known shape and being bar-shaped, which is directly not or not completely striken by fresh air stream introduced in the combustion chamber. Therefore, disadvantageous cooling of the igniting device is eliminated.

In keeping with these objects and with others which will become apparent hereinafter, one feature of the present invention resides, briefly stated, in an internal combustion engine in which ignition device is located outside or substantially outside of the projection of an inlet opening of an overflow passage along a gas stream which flows through the overflow passage into precombustion chamber.

When the internal combustion engine is designed in accordance with these features, it avoids the disadvantages of the prior art.

In accordance with another feature of the present invention incandescent ignition device is inclined relative to the central plane. With these features the above-mentioned condition is satisfied and the ignition device is brought in a region of the fuel stream, so that with a stream deviation from the predetermined normal position, this deviation acts less strong than in the case of a tangential approximation of the ignition device to the fuel stream in accordance with the prior art.

In accordance with a further especially advantageous feature of the present invention, two incandescent ignition devices are provided within a lateral limit of the fuel stream at both sides of the central plane. Here the stream deviation which can be effective relative to the lateral approximation of the glow ignition device to the stream is compensated so that at least one of the two ignition devices or both of them are retained at a completely effective distance to the fuel stream. Deviations of the fuel stream in the axial direction of the ignition device are of a little importance.

The incandescent ignition devices can be inclined to the central plane, and particularly their inclination to the central plane can be different. These features take into consideration the geometrical characteristics of the chamber and the used injection nozzles.

By the non-tangential touching of the ignition device with the fuel stream, the danger of excessively great distance of the fuel stream from the ignition device with the above-mentioned disadvantages for the reliability of the fuel inflammation is avoided, and also the excessively strong thermal loading of the ignition device is eliminated.

The incandescent ignition arrangement can be offset relative to one another, as considered in the direction of the central plane, and in the edge region of the fuel stream. With these features the stream deviation of the fuel stream in the longitudinal direction toward the central plane is also detected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
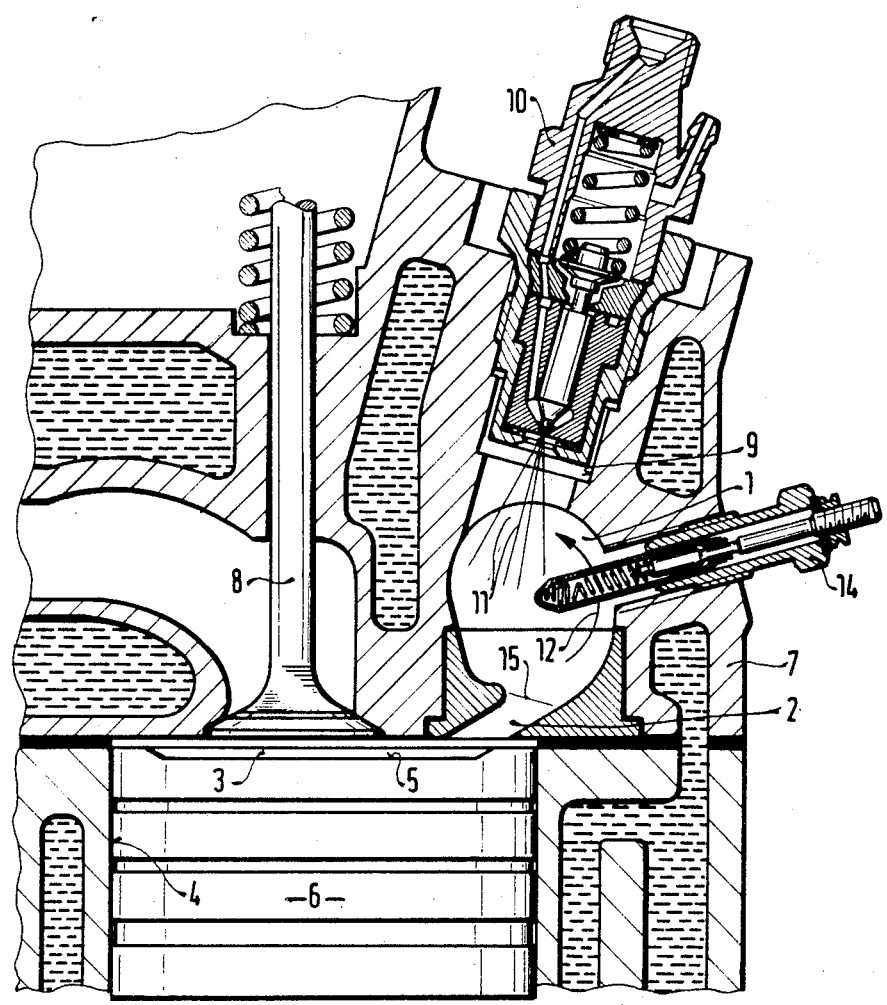
FIG. 1 is a view showing a section of a part of a cylinder head of an internal combustion engine with a whirling chamber and incandescent ignition arrangement of the known type.

FIG. 1 shows a section of a pre-combustion chamber 1 formed as a whirling chamber, with an overflow passage 2 which tangentially opens into the pre-combustion chamber. The overflow passage 2 opens at an obtuse angle at an end surface 5 of a piston 6 of an internal combustion engine. The piston 6 forms in a cylinder opening 4 together with a cylinder head 7, a main combustion chamber 3. The cylinder head is shown partially in section, and the pre-combustion chamber is also arranged in it. Moreover, the cylinder head also includes, in a known manner, gas reversing valves 8 for the gas reversal of the main combustion chamber.

A receiving opening 9 for a fuel injection valve 10 extends tangentially from the pre-combustion chamber. The fuel injection valve 10 controls in a known manner a spherically expanding fuel stream 11 so that it reaches the pre-combustion chamber and supports the rotary direction of the air which flows through the overflow passage 2 and lies at the outlet sides of the whirl identified by the arrow 12.

An incandescent ignition device 14 is screwed in the cylinder head and formed as a bar-shaped spark plug with a tip which ends in the outer region of the spherical fuel stream in the region of the surface center point of the pre-combustion chamber.

Figure 2:
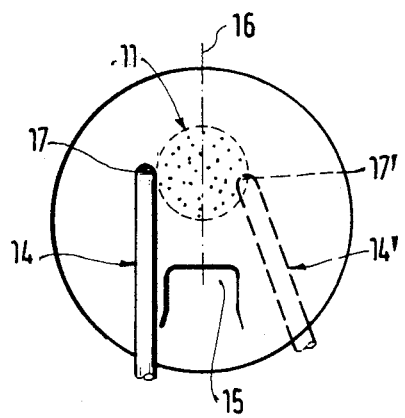
FIG. 2 is a view showing a section taken normal to the plane of the drawing of FIG. 1, through the combustion chamber with the incandescent ignition arrangement in accordance with the present invention, wherein the solid lines represent one embodiment of the invention and the broken lines represent another embodiment.

In accordance with the present invention, the position of the ignition arrangement 14 is changed, as shown in FIG. 2. FIG. 2 shows a section through the pre-combustion chamber parallel to the end surface 5 of the piston 6 as seen in direction toward the inlet of the overflow passage 2. The latter can be recognized by an inlet opening 15 and lies centrally in a central plane 16 of the combustion chamber. Also the fuel stream 11 runs inside the central plane 16.

In accordance with a first embodiment, the bar-shaped incandescent ignition device 14 is arranged relative to the fuel stream 11 so that it extends with its lateral surface at its tip 17 in the end region of the fuel stream 11 which lies with its axis parallel to the central plane 16 and outside of the projection of the inlet opening 15. In accordance with the second embodiment shown in FIG. 2, a second bar-shaped incandescent ignition device 14' shown in broken lines is arranged so that its axis is inclined relative to the central plane 16 and its tip 17' is inserted into the end region of the fuel stream 11. Also, this incandescent ignition device lies outside of the projection of the inlet opening 15, and thereby is not blown by incoming cold air which previously used to cool the ignition device. The inclined position possesses the advantage, as compared with the other construction shown in FIG. 2, that the tip 17' even with great lateral deviations of the fuel stream, remains in the edge region of the fuel stream.

Figure 3:
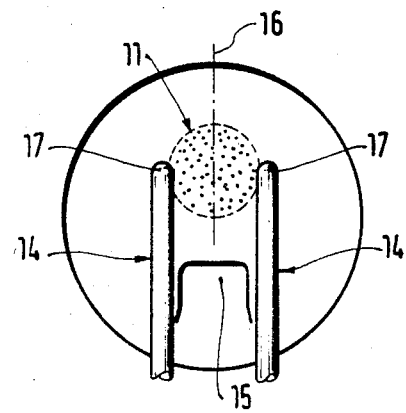
FIG. 3 is a view showing a third embodiment of the present invention with two spark plugs arranged laterally near a fuel stream.

FIG. 3 shows a construction with two bar-shaped incandescent ignition devices 14 whose axes are parallel to the central plane 16 and whose tips 17, similarly to FIG. 2, are inserted in the region of a diameter of the flow stream normal to the central plane into the stream. With this solution the deviations of the fuel stream to the left and to the right toward one or other glow ignition devices are compensated so that always a sufficiently high temperature for inflammation of the fuel is available. Both ignition devices lie outside of the projection of the inlet opening 15 of the overflow passage 2, at most in its edge zones.

Figure 4:
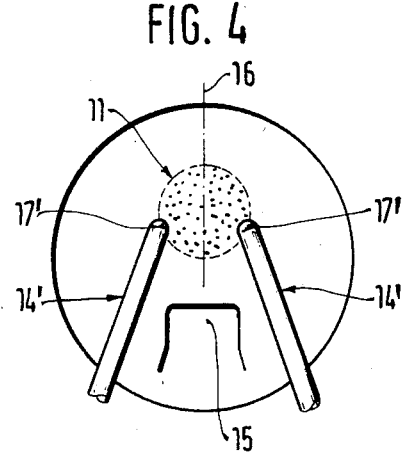
FIG. 4 is a view showing a fourth embodiment of the present invention with two spark plugs which are inclined relative to one another in the edge region of the fuel stream.

In the embodiment of FIG. 4 the bar-shaped incandescent ignition device 14', in contrast to the embodiment of FIG. 3, are inclined relative to one another or relative to the central plane 16, so that their tips 17' are more inserted in the radial direction into the fuel stream 11. This has the advantage that with a deviation of the fuel stream 11 in a small periphery in direction of the central plane 17, the tips 17 of the ignition device 14' still remain in the edge region of the stream.

Figure 5:
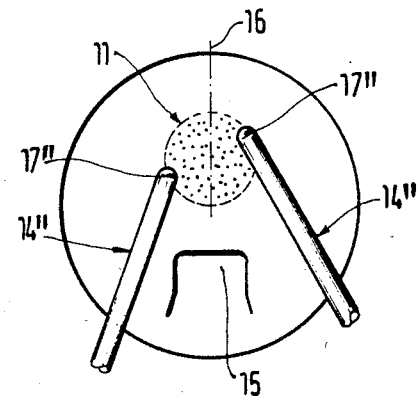
FIG. 5 is a view showing a fifth embodiment of the present invention with two ignition devices which are offset and inclined relative to one another.

In the embodiment of FIG. 5 both bar-shaped incandescent ignition arrangements 14" in contrast to the embodiment of FIG. 4, are arranged so that the tips 17" of the ignition device 14" are offset relative to one another in direction of the central plane 16 and end in the edge region of the fuel stream 11. Therefore, the tips of one ignition device is inserted into the fuel stream at its sides closer to the inlet opening 15, whereas the tip of the other glow ignition device is located diametrically opposite to the first mentioned tip in the edge region of the fuel stream.

In this embodiment the deviations of the fuel stream during the operation of the internal combustion engine from the originally planned normal position both in direction of the central plane 16 and normal to the central plane are detected so that at least always one ignition device lies in an effective contact with the edge region of the fuel stream. Similarly to FIG. 4, here also the shaft of the ignition devices 14" or 14' is located outside of the projection of the inlet opening 15 of the overflow passage.

It will be understood that each of the elements described above, or two or more together, may also find a useful application in other types of constructions differing from the types described above.

While the invention has been illustrated and described as embodied in an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An internal combustion engine, comprising a plurality of cylinders; a main combustion chamber associated with each of said cylinders; a pre-combustion chamber; an overflow passage connecting said main combustion chamber with said pre-combustion chamber, so that said overflow passage tangentially opens into said pre-combustion chamber, said overflow passage having a central axis extending through a central plane of said pre-combustion chamber; a fuel injection device injecting a fuel in form a fuel stream extending also through said central plane of said combustion chamber; an incandescent ignition arrangement provided in said pre-combustion chamber and having a part which extends near said central plane and has a heated end arranged to extend to an end region of said fuel stream in its normal position, said ignition arrangement being located substantially outside of a projection of an inlet opening of said overflow passage along a gas stream flowing through said overflow passage into said pre-combustion chamber and therefore laterally outside of a contour of said inlet opening of said overflow passage.

2. An internal combustion engine, comprising a plurality of cylinders; a main combustion chamber associated with each of said cylinder a pre-combustion chamber; an overflow passage connecting said main combustion chamber with said precombustion chamber, so that said overflow passage tangentially opens into said pre-combustion chamber, said overflow passage having a central axis extending through a central plane of said pre-combustion chamber; a fuel injection device injecting a fuel in form a fuel stream extending also through said central plane of said combustion chamber; an incandescent ignition arrangement provided in said pre-combustion chamber and having a part which extends near said central plane and has a heated end arranged to extend to an end region of said fuel stream in its normal position, said ignition arrangement being located substantially outside of a projection of an inlet opening of said overflow passage along a gas stream flowing through said overflow passage into said pre-combustion chamber, said ignition arrangement including two incandescent ignition devices which are arranged laterally near said flow stream at both sides of said central plane.

3. An internal combustion engine as defined in claim 1, wherein said ignition arrangement is inclined relative to said central plane.

4. An internal combustion engine as defined in claim 2, wherein said ignition devices are inclined relative to said central plane.

5. An internal combustion engine as defined in claim 4, wherein said ignition devices are inclined relative to said central plane so that they have different inclinations relative to the same.

6. An internal combustion engine as defined in claim 4, wherein said ignition devices are offset relative to one another in direction of said central plane and end in an end region of said fuel stream.

7. An internal combustion engine as defined in claim 1, wherein said ignition arrangement is bar-shaped.

* * * * *